United States Patent [19]
Ellingsen

[11] Patent Number: 5,524,921
[45] Date of Patent: Jun. 11, 1996

[54] V-BAR SUSPENSION LINKAGE

[75] Inventor: Svein Ellingsen, Bothell, Wash.

[73] Assignee: PACCAR Inc., Bellevue, Wash.

[21] Appl. No.: 429,069

[22] Filed: Apr. 26, 1995

[51] Int. Cl.⁶ .................................................. B60G 11/26
[52] U.S. Cl. ........................... 280/713; 280/683; 280/688
[58] Field of Search .................................. 280/683, 688, 280/713

[56] References Cited

U.S. PATENT DOCUMENTS

| | | | |
|---|---|---|---|
| 3,204,977 | 9/1965 | Eisenhauer et al. | 280/683 |
| 3,406,983 | 10/1968 | Masser | 280/713 |
| 4,415,179 | 11/1983 | Marinelli | 280/713 |
| 4,422,667 | 12/1983 | Perry | 280/713 |
| 4,667,974 | 5/1987 | Giese | 280/683 |
| 4,900,057 | 2/1990 | Raidel | 280/713 |

OTHER PUBLICATIONS

"Das Phantom aus München," *Fernfahrer, NR.* 8, pp. 29–33, Aug. 1993.
PACCAR T-884, 1988.
VOLVO V-Linkage, 1990.

*Primary Examiner*—Kenneth R. Rice
*Attorney, Agent, or Firm*—Seed and Berry

[57] ABSTRACT

A V-bar suspension linkage is shown and described. In a preferred embodiment, two arms are mounted between the axle and the vehicle frame rails, the arms extending outwardly at an angle to each other to form a "V" shaped linkage, having its vertex at the axle. The first end of each arm is coupled to the axle via a vertically oriented bushing pin that is secured to an axle bracket which in turn is mounted on the axle. By vertically mounting the bushing pins, the ends of the arms may be closer together, thereby increasing the angle between the arms and reducing the stresses in the arms and bushings. The distal end of each arm is coupled to a frame rail via a vertically oriented bushing pin that is secured in place by anchor lugs that are provided on upper and lower gussets that form part of the vehicle frame assembly. The pitch and lateral placement of the axle is easily adjusted at the axle via use of spacers between the axle bracket and bushing pins.

16 Claims, 4 Drawing Sheets

V-BAR SUSPENSION LINKAGE

TECHNICAL FIELD

This invention relates to vehicle suspensions, and more particularly, to a V-bar suspension linkage.

BACKGROUND OF THE INVENTION

In currently available vehicle suspensions, it is common to provide a V-bar linkage between the axle and the frame rails, in order to position the axle and to control forces generated by the acceleration and deceleration of the vehicle.

In one currently available system, a bracket is mounted on the axle, the bracket being adapted to engage two horizontally oriented bushing pins. Surrounding each bushing pin is the end of an arm in the linkage, the two arms extending outwardly at an angle from one another to form a "V" shaped bar, the distal ends of the arms being coupled to opposing frame rails. Each of the distal ends of the two arms is coupled to a frame rail via a horizontally oriented bushing pin that is coupled to a bracket that in turn is connected to the frame rail.

In another currently available system, the connection between the arms of a V-bar linkage and the frame is similar to that described above, however the vertex of the V-bar linkage is a single ball joint, such that the angle formed between the two arms is fixed.

Although currently available systems provide acceptable results, it is believed that an improved V-bar linkage may be achieved.

SUMMARY OF THE INVENTION

It is therefore an object of this invention to provide an improved V-bar suspension linkage.

It is another object of this invention to provide a V-bar linkage that is simple to manufacture and install.

It is another object of this invention to provide an improved method for positioning a vehicle axle.

These and other objects of the invention, as will be apparent herein, are accomplished by providing an improved V-bar suspension linkage. In a preferred embodiment, an axle bracket is mounted on a top surface of the axle, spaced equidistantly from either frame rail. The axle bracket is adapted to engage two vertically oriented bushing pins. Each vertically oriented bushing pin is surrounded by the end of an arm, the two arms extending outwardly at an angle to one another to form a "V" shaped linkage, the vertex of the V being located at the axle bracket. The distal end of each arm is coupled to an opposing frame rail via a vertically oriented bushing pin that is held in place between an upper and lower anchor lug, the anchor lugs being provided on upper and lower gussets, respectively. The gussets serve to create the vehicle frame by being bolted to a frame rail and to a crossmember that extends between the two frame rails. This type of frame construction is referred to as a ladder frame.

By providing a suspension linkage in this manner, the ends of the arms at the axle may be closer together than in a conventional system where the bushing pins are oriented horizontally. By bringing the ends of the arms closer together, the angle between the two arms is increased. It is believed that by increasing this angle, stresses in the arms and bushings are reduced. Furthermore, by providing anchor lugs on existing frame structure, namely the gussets, the need for an additional bracket specifically designed to engage the bushing pin is eliminated, thereby reducing the weight and cost of the suspension system. Also, given the geometry of the linkage and the location of the axle bracket, both the lateral location and pitch of the axle may be controlled by placing spacers between the axle bracket and the bushing pins.

DETAILED DESCRIPTION OF THE INVENTION

In vehicle suspension systems, it is desirable to provide torque rods to absorb high stresses that are generated by acceleration and deceleration of the vehicle, and to transmit these forces to the vehicle frame. It is also desirable and necessary to center a vehicle axle laterally with respect to the frame rails and to set the slant or pitch of the axle at a desired angle. All of these functions are accomplished in accordance with the present invention, by providing an improved V-bar linkage.

Figure 1:
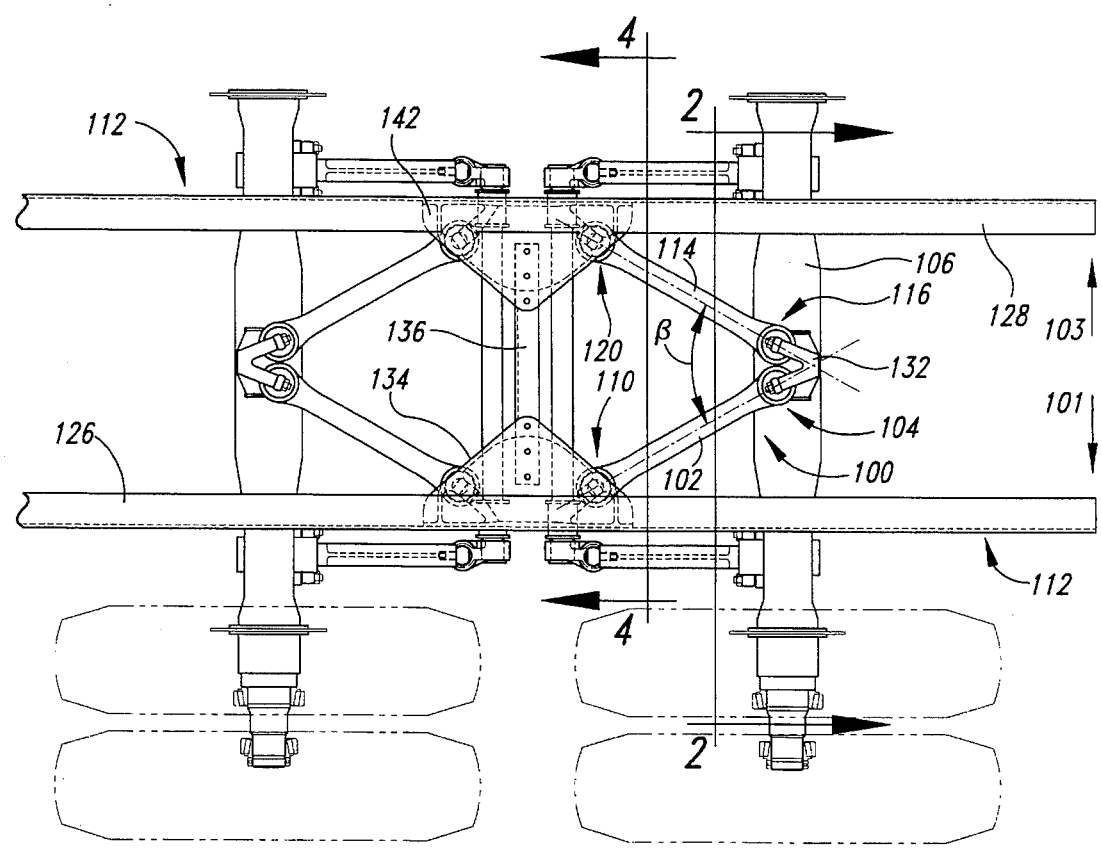
FIG. 1 is a top plan view of a preferred embodiment of the present invention.
Figure 2:
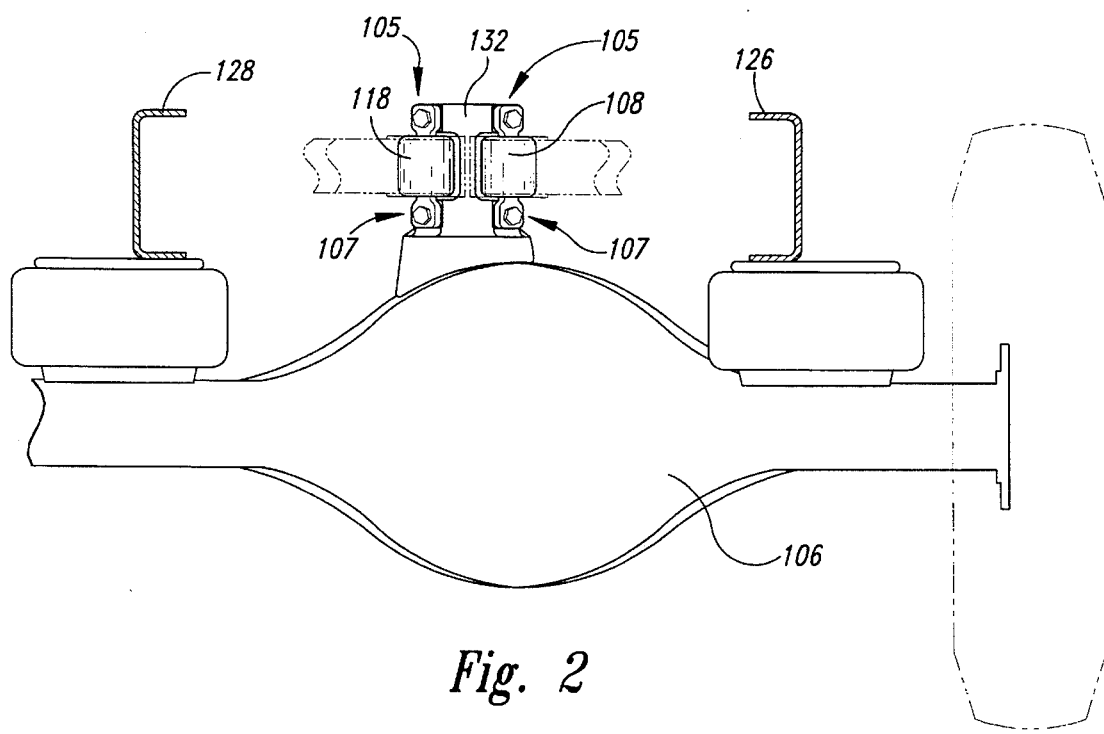
FIG. 2 is a cross-sectional elevational view taken along line 2—2 of FIG. 1.

As illustrated in FIGS. 1 and 2, an axle bracket 132 is mounted on axle 106 so that axle bracket 132 is centered with respect to the vehicle frame 112 having a first frame rail 126 and second frame rail 128. The axle bracket 132 is configured to engage two vertically oriented bushing pins 108, 118. The first and second vertically oriented bushing pins 108, 118 serve as the anchor points for a first arm 102 and second arm 114 respectively, the first and second arms extending outwardly at an angle to each other to form V-bar linkage 100.

As best seen in FIG. 2, a first end 104 of first arm 102 surrounds the first vertically oriented bushing pin 108, and the first end 116 of second arm 114 surrounds the second vertically oriented bushing pin 118. Unlike prior art configurations wherein the bushing pins are horizontally mounted, the vertical orientation of bushing pins 108 and 118 allow the first end of each of the first and second arms to be closer together at the axle 106 or vertex of the V-bar linkage. As a result, a greater angle $\beta$ is achieved, as measured between a center line of each arm. In a preferred embodiment, $\beta$ is 56°–72°. It is believed that by increasing this angle, stresses in the arms and bushings are reduced, thereby improving the reliability of the system. Furthermore, by orienting bushing pins 108 and 118 in a vertical direction, it is possible to provide a narrower axle bracket 132, thereby reducing the width and weight of the bracket.

Figure 3:
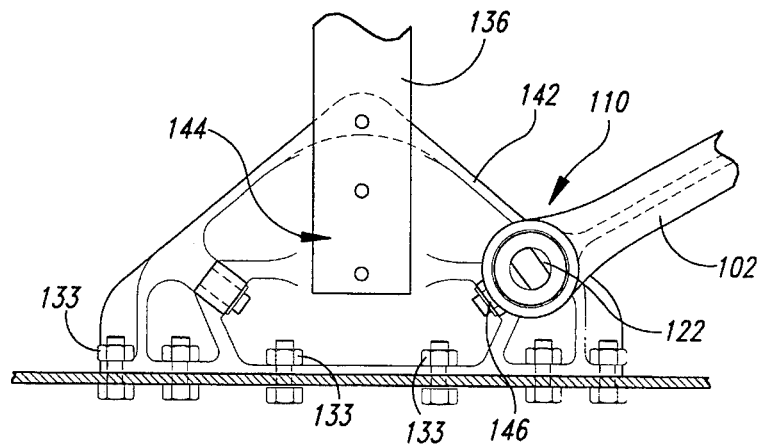
FIG. 3 is an enlarged top plan view of a portion of the preferred embodiment illustrated in FIG. 1.
Figure 4:
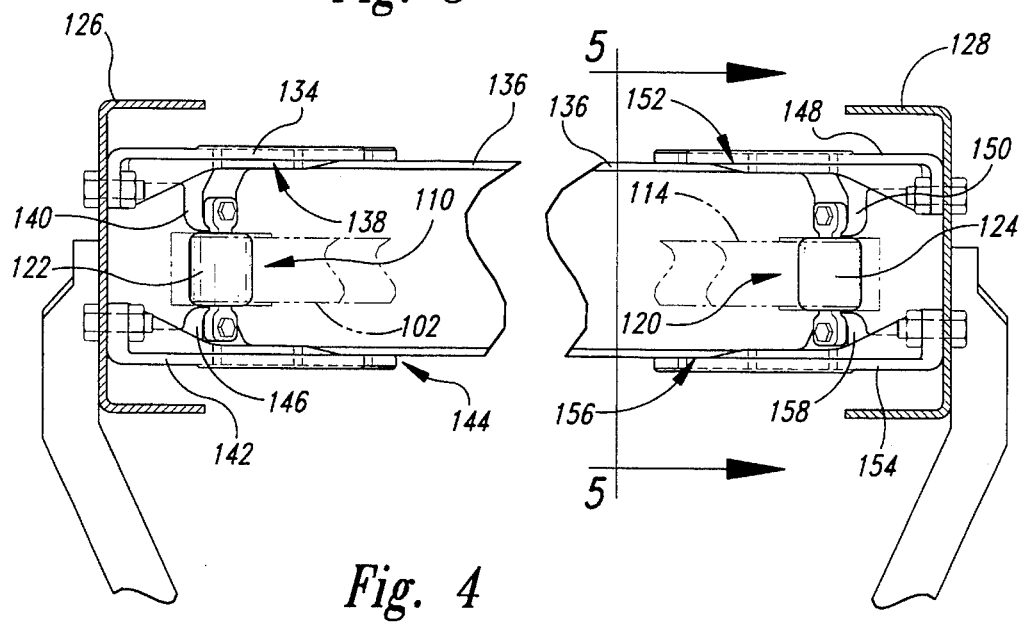
FIG. 4 is a cross-sectional elevational view taken along line 4—4 of FIG. 1.
Figure 5:
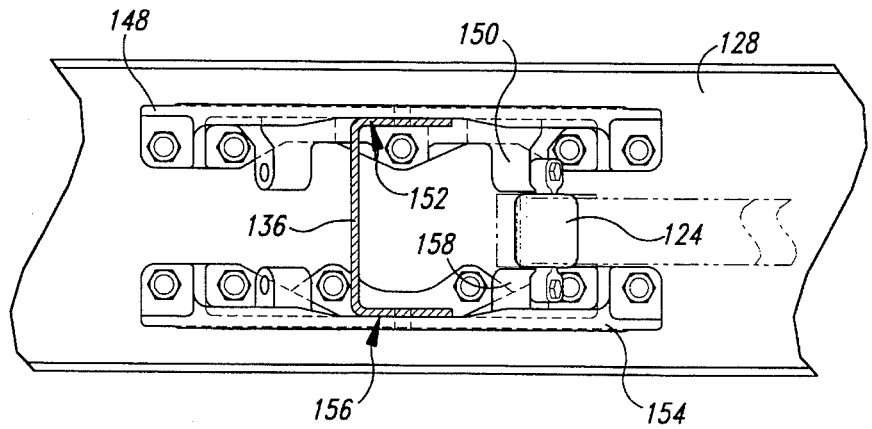
FIG. 5 is a cross-sectional elevational view taken along line 5—5 of FIG. 4.

As illustrated in FIGS. 3–5, a second end 110 of first arm 102 is coupled to first frame rail 126 via a third vertically oriented bushing pin 122. In a ladder-type vehicle frame, crossmembers such as that illustrated at 136 extend between the frame rails 126 and 128. Crossmember 136 is coupled to the frame via a first gusset 134 that is coupled, for example, via bolts, to a first upper surface 138 of crossmember 136. A second gusset 142 is coupled to a first lower surface 144 of crossmember 136, and then the first and second gussets are coupled, for example via bolts 133, to the frame rail. In a preferred embodiment of the present invention, a first anchor lug 140 is provided on the first gusset 134, and a second anchor lug 146 is provided on the second gusset 142, the first and second anchor lugs being spaced to accommodate and engage the third vertically oriented bushing pin 122.

Similarly, the second end 110 of second arm 114 is coupled to the second frame rail 128 via a fourth vertically oriented bushing pin 124. Frame crossmember 136 is coupled to the second frame rail 128 via a third gusset 148 that is coupled to a second upper surface 152 of crossmember 136, and via a fourth gusset 154 that is coupled to a second lower surface 156 of the crossmember, the third and fourth gussets being coupled to the frame rail. A third anchor lug 150 is provided on third gusset 148 and a fourth anchor lug 158 is provided on the fourth gusset 154. The third and fourth anchor lugs are spaced to accommodate and engage the fourth vertically oriented bushing pin 124. By providing anchor lugs on the gussets to engage the vertically oriented bushing pins, the need for an additional bracket to secure the bushing pin is eliminated. The cost and weight of the system is therefore reduced.

Figure 6:
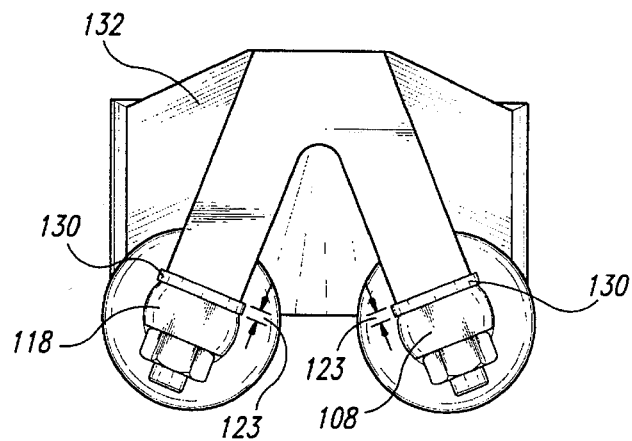
FIG. 6 is an enlarged top plan view of an axle bracket as illustrated in FIG. 1.
Figure 7:
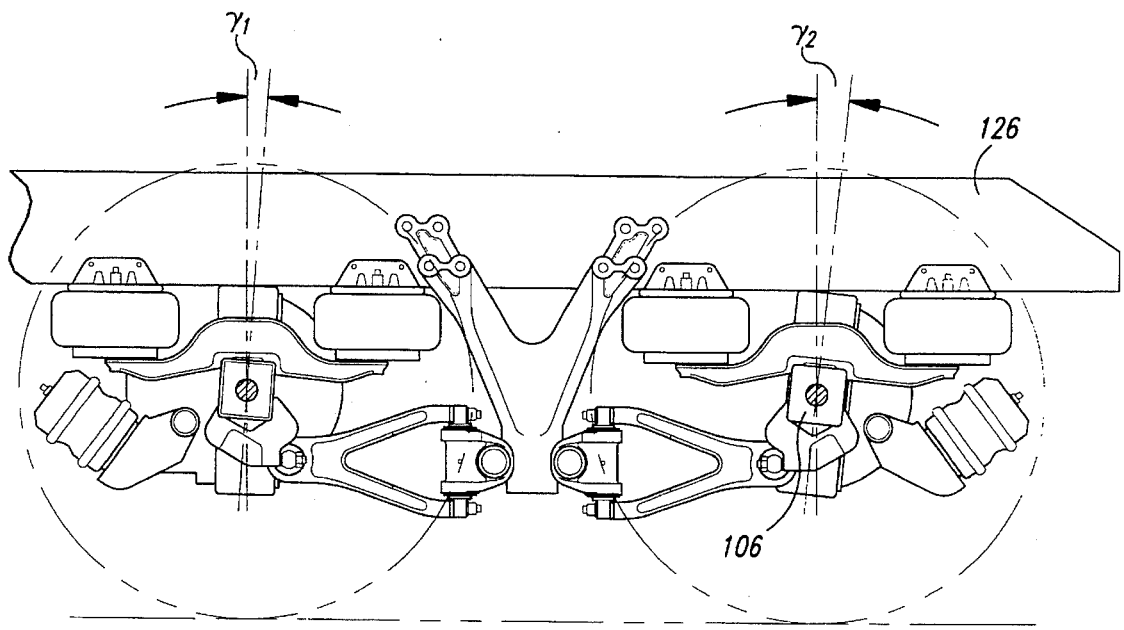
FIG. 7 is a front elevational view of the preferred embodiment illustrated in FIG. 1.
Figure 8:
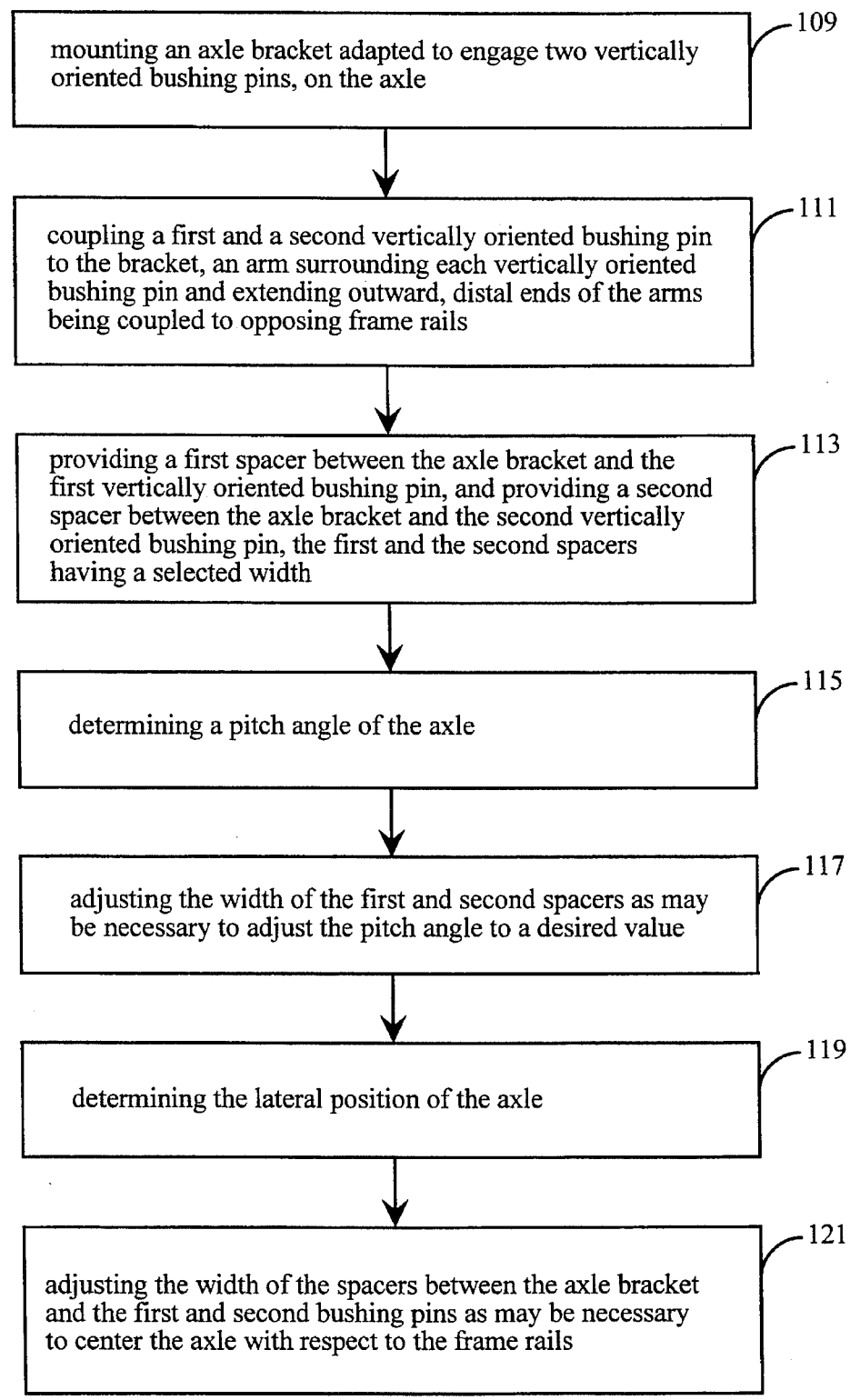
FIG. 8 is a diagram illustrating the steps of a preferred embodiment of the present invention.

By providing a V-bar suspension linkage in accordance with the present invention, the position and alignment of the axle may be easily adjusted at the axle bracket 132 via spacers 130 that are placed between the axle bracket and the bushing pins 108 and 118, as best seen in FIG. 6. In a preferred embodiment, the axle and V-bar linkage are initially mounted using spacers having a selected thickness 123, for example 0.5 inch, steps 109, 111 and 113. (It will be understood that for each bushing pin spacers of equal thickness are placed on both the top and bottom linkage points 105 and 107 with the axle bracket.) The slant and lateral location of the axle is then determined, and adjusted as desired using spacers. For example, as illustrated in FIG. 7, a desired slant or pitch $\gamma_1$ for a front axle may be 2.5°, while the desired pitch $\gamma_2$ of the rear axle 106 may be 10.75°. (It will be understood by one of ordinary skill in the art that the degree of slant desired is dependent on the axle and transmission configuration.) Assuming, for example, that the pitch of axle 106 is measured to be 10°, step 115, thicker spacers, of equal width, are placed between the axle bracket 132 and first and second bushing pins 108 and 118, thereby forcing the axle 106 to rotate backwards to the desired pitch. Conversely, if the axle slant is too great, initial spacers 130 located between the axle bracket 132 and first and second bushing 108 and 118 pins are replaced by thinner spacers, of equal width, thereby allowing the axle to tilt forward, step 117.

In terms of the lateral position of the axle, it is desirable to center axle 106 between the frame rails 126 and 128. If it is determined, for example, that the axle is too far to the left, step 119, left being indicated at reference arrow 101 in FIG. 1, the original spacers between the axle bracket and the first bushing pin 108 are replaced by thicker spacers, and the spacers between the frame bracket and second bushing pin 118 are replaced by thinner spacers, the difference in thickness between the original spacers and the thicker and thinner spacers being the same. The axle will therefore move to the right, step 121. Similarly, if it is desired to shift the axle to the left, thicker spacers would replace the initial spacers between the axle bracket and second bushing pin 118, and thinner spacers would replace the initial spacers between the axle bracket and first bushing pin 108, the thickness of the new spacers differing from the thickness of the initial spacers by the same amount. The axle will therefore shift to the left. The axle may therefore be very simply and accurately adjusted as desired.

A V-bar suspension linkage has been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

What is claimed is:

1. A vehicle suspension linkage comprising:
   a first arm coupled at a first end to an axle via a first vertically oriented bushing pin and at a second end to a frame of the vehicle; and
   a second arm coupled at a first end to the axle via a second vertically oriented bushing pin and at a second end to the frame.

2. The suspension linkage according to claim 1 wherein the first arm is coupled to the frame via a third vertically oriented bushing pin and the second arm is coupled to the frame via a fourth vertically oriented bushing pin.

3. The suspension linkage according to claim 2, further comprising:
   a first gusset coupled to a first frame rail and to a first upper surface of a frame crossmember, the first gusset having a first anchor lug;
   a second gusset coupled to the first frame rail and to a first lower surface of the frame crossmember, the second gusset having a second anchor lug, the third vertically oriented bushing pin being mounted between the first anchor lug and the second anchor lug;
   a third gusset coupled to a second frame rail and to a second upper surface of the frame crossmember, the third gusset having a third anchor lug; and
   a fourth gusset coupled to the second frame rail and to a second lower surface of the frame crossmember, the fourth gusset having a fourth anchor lug, and wherein the fourth vertically oriented bushing pin is mounted between the third anchor lug and the fourth anchor lug.

4. The suspension linkage according to claim 1 wherein the first end of the first arm is adjacent to the first end of the second arm and the second end of the first arm is coupled to a first frame rail and the second end of the second arm is coupled to a second frame rail, the first and second frame rails being laterally spaced, such that the first arm is at an angle relative to the second arm.

5. The suspension linkage according to claim 4 wherein the angle, as measured between a center line of each of the first and second arms, is 56°–72°.

6. The suspension linkage according to claim 1, further comprising:
   an axle bracket coupled to the axle, the first and second vertically oriented bushing pins being detachably attached to the axle bracket.

7. The suspension linkage according to claim 6, further comprising spacers that are mounted between the axle bracket and each of the first and second vertically oriented bushing pins to place the axle in a desired position.

8. The suspension linkage according to claim 7 wherein the spacers are used to set a pitch and a lateral position of the axle.

9. A vehicle suspension comprising:

an axle;

a first frame rail positioned substantially perpendicular to the axle;

a second frame rail being laterally spaced and substantially parallel to the first frame rail;

a frame crossmember extending between the first and second frame rails, and being laterally spaced and substantially parallel to the axle;

a first arm coupled at a first end to the axle via a first vertical oriented bushing pin and at a second end to the first frame rail; and a second arm coupled at a first end to the axle via a second vertically oriented bushing pin and at a second end to the second frame rail.

10. The suspension linkage according to claim 9 wherein the first arm is coupled to the frame via a third vertically oriented bushing pin and the second arm is coupled to the frame via a fourth vertically oriented bushing pin.

11. The suspension linkage according to claim 9, further comprising:

a first gusset coupled to a first frame rail and to a first upper surface of a frame crossmember, the first gusset having a first anchor lug;

a second gusset coupled to the first frame rail and to a first lower surface of the frame crossmember, the second gusset having a second anchor lug, the third vertically oriented bushing pin being mounted between the first anchor lug and the second anchor lug;

a third gusset coupled to a second frame rail and to a second upper surface of the frame crossmember, the third gusset having a third anchor lug; and a fourth gusset coupled to the second frame rail and to a second lower surface of the frame crossmember, the fourth gusset having a fourth anchor lug, and wherein the fourth vertically oriented bushing pin is mounted between the third anchor lug and the fourth anchor lug.

12. The suspension linkage according to claim 9 wherein the first end of the first arm is adjacent to the first end of the second arm and the second end of the first arm is coupled to a first frame rail and the second end of the second arm is coupled to a second frame rail, the first and second frame rails being laterally spaced, such that the first arm is at an angle relative to the second arm.

13. The suspension linkage according to claim 9 wherein the angle, as measured between a center line of each of the first and second arms, is 56°–72°.

14. The suspension linkage according to claim 9, further comprising spacers that are mounted between the axle and each of the first and second arms to place the axle in a desired position.

15. The suspension linkage according to claim 9, further comprising:

an axle bracket coupled to the axle, the first and second vertically oriented bushing pins being detachably attached to the axle bracket.

16. A method for positioning an axle comprising:

mounting an axle bracket adapted to engage two vertically oriented bushing pins, on the axle;

coupling a first and a second vertically oriented bushing pin to the bracket, an arm surrounding each vertically oriented bushing pin and extending outward, distal ends of the arms being coupled to opposing frame rails;

providing a first spacer between the axle bracket and the first vertically oriented bushing pin, and providing a second spacer between the axle bracket and the second vertically oriented bushing pin, the first and the second spacers having a selected width;

determining a pitch angle of the axle;

adjusting the width of the first and second spacers as may be necessary to adjust the pitch angle to a desired value;

determining the lateral position of the axle; and adjusting the width of the spacers between the axle bracket and the first and second bushing pins as may be necessary to center the axle with respect to the frame rails.

\* \* \* \* \*